UNITED STATES PATENT OFFICE.

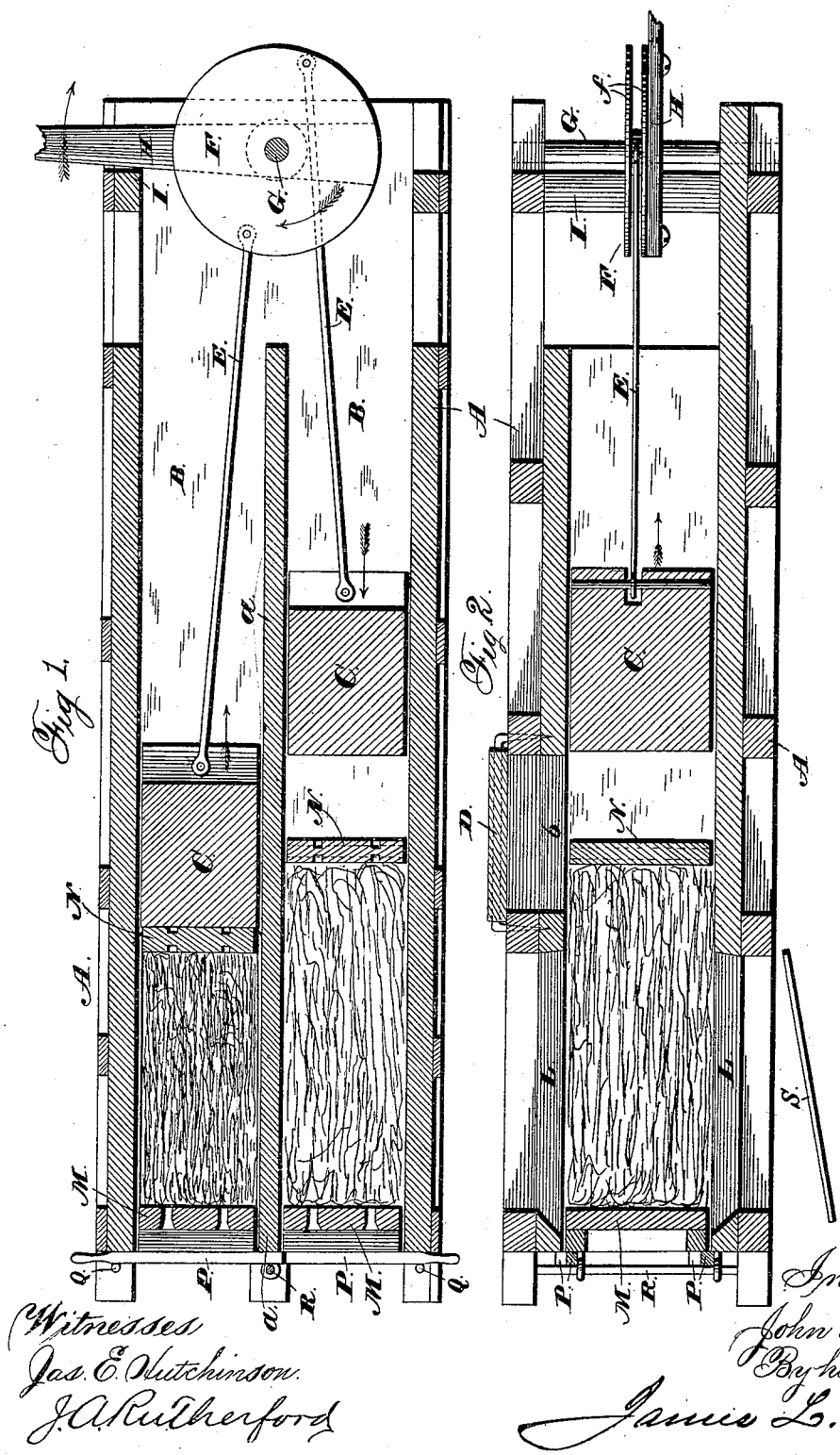

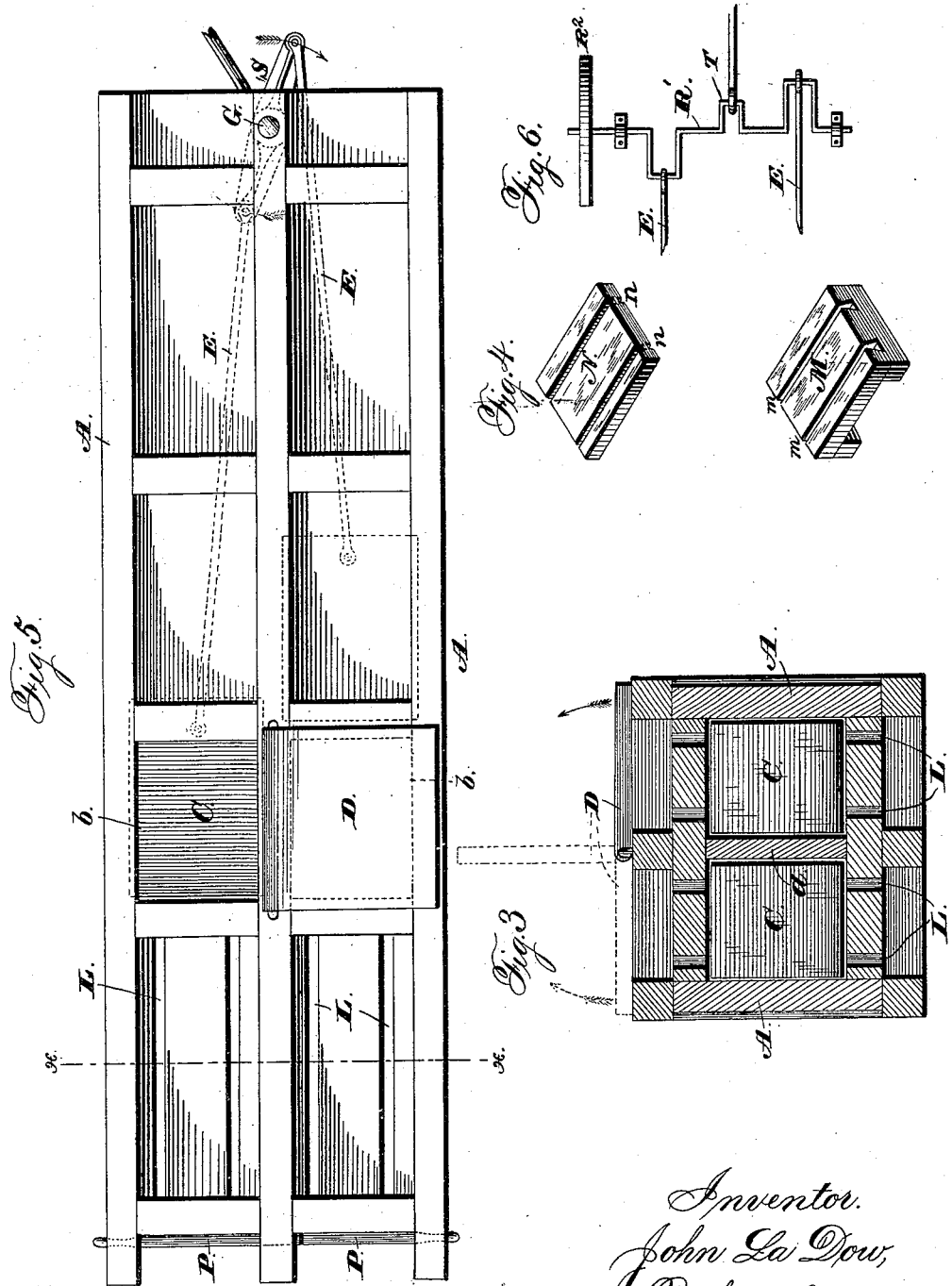

JOHN LA DOW, OF ALBANY, NEW YORK.

BALING-PRESS.

SPECIFICATION forming part of Letters Patent No. 265,516, dated October 3, 1882.

Application filed March 6, 1882. (No model.)

*To all whom it may concern:*

Be it known that I, JOHN LA DOW, a citizen of the United States, residing at Albany, in the county of Albany and State of New York, have invented new and useful Improvements in Baling-Presses, of which the following is a specification.

This invention relates to presses for baling hay, cotton, or other like articles, in which the material to be baled is fed into the baling-chambers and compressed by the action of reciprocating followers which move alternately in opposite directions.

The objects of my invention are to improve the mechanism for actuating the followers, whereby their action is rendered certain, direct, and effective; also, to provide means whereby the wire can be passed around the bale and tied at the end of the machine; also, to provide stops for limiting the vibration of the sweep by which the mechanism for reciprocating the followers is actuated; also, to provide means for preventing the feed into but one of a pair of parallel compartments at a time; also, to provide an improved organization of members tending to compress the bale and to admit of the same being readily hooped or tied; also, to provide certain other improved details of construction, which will be hereinafter described, and pointed out in the claims.

In the drawings, Figure 1 is a horizontal longitudinal section of the press; Fig. 2, a vertical longitudinal section thereof; Fig. 3, a transverse section. Fig. 4 shows one of the channeled followers, and also one of the slotted abutments. Fig. 5 is a top or plan view of the press, and shows a vibratory cross-head that can be used in connection with the press adapted for tying the bale from its end. Fig. 6 shows a double-cranked shaft that can be used in place of the cross-head shown in Fig. 5.

The box or casing A of the baling-press is divided for the greater portion of its length by the longitudinal vertical partition $a$ into two compartments, that are preferably parallel with each other, and which constitute the bale-chambers B B, both located in the same horizontal plane. The reciprocating platens C slide within these compartments for the purpose of compressing the bales, and in order to provide a ready means for feeding the hay or other article to be baled into one compartment, without liability of the accidental falling of the material into the remaining compartment, I provide a single door, D, hinged upon the casing between the two feed-openings $b$, so that the said door can be swung over to either side, and thus close one opening and leave the other free for the passage of the material into the bale-chamber at that side of the press. The platens which traverse the bale-chambers move alternately in opposite directions within their respective chambers, and to attain such movement I connect the links or pitmen E that reciprocate the platens to a horizontal wheel, F, which is located at one end of the press upon a vertical shaft, G, having its bearings secured to the frame-work at the top and bottom of the press. A sweep, H, is attached to the wheel and vibrated for the purpose of giving to the same the part revolutions requisite for reciprocating the links or pitmen and their respective platens. The wheel F, to which the links or pitmen are connected, consists of a hub having two disks or flanges, $f$, that are parallel to each other and separated so as to leave an intervening space for the links or pitmen, which are connected to wrist-pins located near the periphery of the wheel at opposite sides of the shaft.

The sweep or vibratory lever H can be operated in any desirable way—as, for example, by horse-power or by connection with the pitman of an engine. When this sweep is moved in one direction and a part rotation thereby imparted to the wheel, one of the platens will be advanced to compress the material within the bale-chamber in which it operates, while the remaining platen will be drawn back in the second bale-chamber, while the reverse motion of the sweep will act to retract the first platen and advance the other, and so on alternately.

It will be observed that the links or pitmen have a direct action on the platens, the space between the disks or flanges of the wheel allowing a pitman to be brought near the center of motion when the platen with which it is connected is withdrawn to the farthest extent, as shown in Fig. 4, it being also noted by referring to the other pitman shown in said figure that when the pitman is thrown forward it will be in substantially the same line as that which it occupied in the first-mentioned position, so that a slight movement on the part of the wheel will now bring the pitman in the dead-center line. This constitutes an exceedingly effective mechanism for operating the platens, being capable of great strength and power, and at the same time being simple and economical. The wheel is located at an end of the box not separated by the central longitudinal partition, and to afford stops at this end of the box for limiting the extent of movement on the part of the sweep I provide the vertical bars I, against which the sweep will strike after it has been moved to the required extent. These bars also constitute braces for strengthening the box or casing at this end of the press. The top and bottom walls of the bale-chambers are slotted longitudinally, so that the cords or wires can be passed through the slots L for the purpose of hooping or tying up the bales. Removable abutments M, adapted to be fitted in the delivery ends of the bale-chambers, are provided to receive the pressure of the bale as it is being impacted by the platen, and followers N are arranged in advance of the platens. These abutments are formed with vertical slots $m$, and the followers formed on both sides with the vertical and parallel channels $n$, as shown. By constructing the follower and abutment as above described the bale can be tied from the end of the press in the following manner: The wire will be passed from the end of the press through the slotted abutment and up through the slotted top wall of the bale-chamber, then carried over the bale that is being pressed, and passed down through the slotted wall and a channel of the follower as soon as the channels of the latter have been brought under the slots in the top wall of the bale-chamber. The wire will then pass down through the slotted bottom of the bale-chamber, and, striking against an inclined guide-plate, S, fixed to the under side of the press, its end will be directed toward the delivery end of the press, where it can be readily grasped by the operator and passed up through the slotted bottom of the bale-chamber into one of the slots of the end abutment, a slight inclination of the wire tending to bring its end through the slotted abutment to the outer side thereof, where it can be readily taken hold of by the operator and tied as soon as the bale has been properly compressed. This avoids tying the bale from either the top or bottom of the press.

The slotted abutments, when fitted in the delivery ends of the bale-chambers, are held therein during the operation of compressing and tying up the bales by means of the locking-bars P, that are placed across this end of the press, and held by the bracket-hooks Q Q and by the vertical rod R, which is rigidly secured to the casing, the bars being passed back of said rod.

It will be observed that after the bale has been pressed and the platen thrown forward to its farthest extent the pitman will be in the dead-center line of the wheel, and hence the platen will be automatically locked, it being understood that the driving-power will be stopped at this juncture. While thus locked the bundle can be baled or tied with the wires usually employed.

I have hereinbefore described the manner in which the bale can be tied from the end of the press. In this connection the links or pitmen could be connected with a vibratory cross-head, S, (shown in Fig. 5;) or they could be connected with a double-cranked shaft, R', (shown in Fig. 6,) in which latter instance a fly-wheel, $R^2$, would be employed and the engine-piston connected with a third cranked portion, T, upon the shaft R'. It will be understood, however, that I make no claim to either the swinging cross-head or to the double-cranked shaft.

What I claim is—

1. The combination, in a baling-press, of the mechanism for reciprocating the two platens in reverse directions within their respective bale-chambers and for locking either platen in position to hold the bale in a pressed condition within the bale-chamber to admit of its being baled, the same consisting in a horizontal wheel, F, to which the pitmen are connected at opposite sides of the shaft upon which the wheel is mounted, and a vibratory sweep-lever attached to the said wheel, substantially as described.

2. The combination, with the horizontal bale-compartment located in the same horizontal plane, and having slotted top and bottom walls, of the follower N, formed with vertical channels, and the abutment located at the end of the baling-compartment and having vertical slots formed through it, whereby the wire can be passed around the bale and tied at the end of the press, substantially in the manner described.

3. The combination, with the two followers respectively arranged within the two horizontal bale-chambers, of the double-flanged wheel F, having the vibratory sweep-lever attached thereto, and the pitmen for actuating the followers connected with wrist-pins located between the flanges of the wheel, and at opposite sides of the center of motion, substantially as described.

4. The combination, in a baling-press, of the reciprocating platens C, located within the horizontal baling-chambers, with the wheel F, mounted at one end of the machine, and connected by links or pitmen with said platens, the vibratory sweep-lever attached to the wheel, and stops respectively located on the end of the press-chambers on opposite sides of the wheel, to check the swing of the sweep when either pitman is on the dead-center and in position to lock the platen with which it connects, substantially as described.

5. The combination, in a baling-press, with the two parallel bale-chambers B, provided with feed-openings and movable platens C, of the door D, hinged to the top of the bale-box between said feed-openings, and adapted to be swung to either side, so as to close either opening, substantially as described.

In testimony whereof I have hereunto set my hand in the presence of two subscribing witnesses.

JOHN LA DOW.

Witnesses:
 VINTON COOMBS,
 JAMES A. RUTHERFORD.